United States Patent
Yamaguchi

(10) Patent No.: US 10,363,940 B2
(45) Date of Patent: Jul. 30, 2019

(54) VEHICLE POSITION ATTITUDE-ANGLE ESTIMATION DEVICE AND VEHICLE POSITION ATTITUDE-ANGLE ESTIMATION METHOD

(71) Applicant: NISSAN MOTOR CO., LTD., Yokohama-shi, Kanagawa (JP)

(72) Inventor: Ichiro Yamaguchi, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 14/908,407

(22) PCT Filed: Jun. 19, 2014

(86) PCT No.: PCT/JP2014/066311
§ 371 (c)(1),
(2) Date: Jan. 28, 2016

(87) PCT Pub. No.: WO2015/015939
PCT Pub. Date: Feb. 5, 2015

(65) Prior Publication Data
US 2016/0185355 A1    Jun. 30, 2016

(30) Foreign Application Priority Data

Aug. 1, 2013 (JP) ................................. 2013-160074

(51) Int. Cl.
*B60W 40/114* (2012.01)
*B60W 40/105* (2012.01)
(Continued)

(52) U.S. Cl.
CPC ........ *B60W 40/114* (2013.01); *B60W 40/105* (2013.01); *G01C 21/165* (2013.01);
(Continued)

(58) Field of Classification Search
CPC ........ G01C 21/165; G06T 2207/30224; G01S 19/50
See application file for complete search history.

(56) References Cited

U.S. PATENT DOCUMENTS

2009/0143987 A1* 6/2009 Bect .................... B60R 21/0134
701/301
2011/0109759 A1   5/2011 Abe
(Continued)

FOREIGN PATENT DOCUMENTS

JP    2010-224755 A    10/2010
JP    2011-040993 A    2/2011
(Continued)

OTHER PUBLICATIONS

Y. Sato, "A Study of Line Based Localization for RoboCup Middle Size League-Speeding-up with New Direction Estimation Algorithm", The Robotics and Mechatronics Conference '09 Koen Ronbunshu, The Japan Society of Mechanical Engineers, May 24, 2009, pp. 1-9.
(Continued)

*Primary Examiner* — Zhubing Ren

(57) ABSTRACT

A vehicle position attitude-angle estimation device sets a particle existent distribution range to a predetermined range by using a particle filter and disperses particles within the set existent distribution range to estimate the position and attitude angle of a vehicle from an image capturing the surroundings of the vehicle. The vehicle position attitude-angle estimation device widens the set existent distribution range in the vehicle width direction of the vehicle when the speed of the vehicle becomes high.

8 Claims, 12 Drawing Sheets

(51) Int. Cl.
  *G01C 21/16* (2006.01)
  *G06T 7/70* (2017.01)
  *G06T 7/277* (2017.01)

(52) U.S. Cl.
  CPC ............... *G06T 7/277* (2017.01); *G06T 7/70* (2017.01); *B60W 2420/42* (2013.01); *B60W 2520/12* (2013.01); *B60W 2520/14* (2013.01); *G06T 2207/30244* (2013.01); *G06T 2207/30252* (2013.01)

(56) References Cited

U.S. PATENT DOCUMENTS

2012/0150437 A1\* 6/2012 Zeng .................... B60W 30/12
  701/456
2014/0347207 A1\* 11/2014 Zeng ...................... G01S 13/87
  342/71

FOREIGN PATENT DOCUMENTS

JP  2012108798 A  6/2012
WO  2013002067 A  1/2013

OTHER PUBLICATIONS

D. Wang, "Particle Filter Based Robust Mobile Robot Localization", Proceedings of the 2009 IEEE International Conference on Mechatronics and Automation, Aug. 9-12, 2009, pp. 817-821.

\* cited by examiner

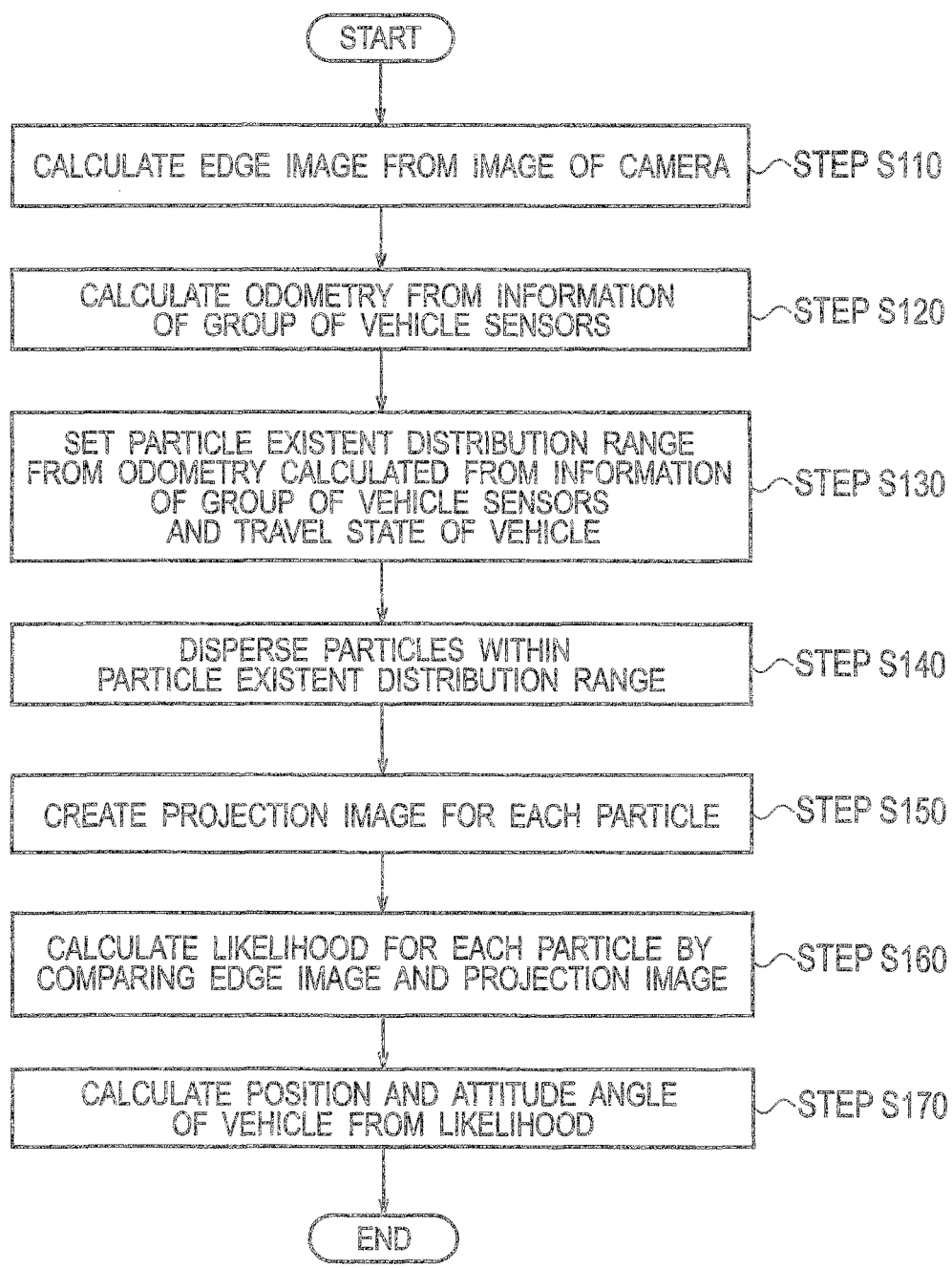

VEHICLE POSITION ATTITUDE-ANGLE ESTIMATION DEVICE AND VEHICLE POSITION ATTITUDE-ANGLE ESTIMATION METHOD

CROSS REFERENCE TO RELATED APPLICATION

The present application claims priority to Japanese patent Application No. 2013-160074 filed on Aug. 1, 2013, the entire content of which is herein incorporated by reference.

TECHNICAL FIELD

The present invention relates to a vehicle position attitude-angle estimation device and method for estimating the position and attitude angle of a vehicle by using a particle filter.

BACKGROUND

Japanese Patent Application Publication No. 2010-224755 has heretofore disclosed a technique to calculate the position and attitude angle of a moving body by using a particle filter. In this technique, a plurality of particles is dispersed in the vicinity of the position and attitude angle of a moving body calculated by odometry. Then, of these particles, the particle with the closest match with values measured by a laser sensor mounted to the moving body is calculated as the true values of the position and attitude angle of this moving body.

In doing so, how much the position and attitude angle calculated using the particle filter are corrected is calculated successively, and a existent distribution range within which to disperse the particles is set in accordance with the history of these amounts of correction.

Here, the above conventional technique takes into consideration an error in the advancing direction of the vehicle but does not sufficiently take into consideration an error in the vehicle width direction. In particular, when the vehicle corners at high vehicle speed, a large movement is produced on the vehicle in the vehicle width direction, thus causing a large error in the vehicle width direction. However, this situation is not sufficiently handled in the conventional practice. This leads to a problem in that the particle existent distribution range is set with a delay and therefore fails to be set appropriately.

SUMMARY

Thus, the present invention has been made in view of the circumstance mentioned above, and an object thereof is to provide a vehicle position attitude-angle estimation device and method which are capable of appropriately setting a particle existent distribution range even when the speed of the vehicle becomes high and a movement is produced on the vehicle in the vehicle width direction.

To solve the problem mentioned above, a vehicle position attitude-angle estimation device and method according to one aspect of the present invention involve: setting a particle existent distribution range to a predetermined range by using a particle filter; dispersing particles within the set existent distribution range to estimate the position and attitude angle of the vehicle from an image capturing the surroundings of a vehicle; and widening the set existent distribution range in the vehicle width direction of the vehicle when the speed of the vehicle becomes high.

BRIEF DESCRIPTION OF THE DRAWINGS

FIG. 2 is a flowchart showing the procedure of a vehicle position attitude angle estimation process by the vehicle position attitude-angle estimation device according to the first embodiment of the present invention;

DETAILED DESCRIPTION OF THE EMBODIMENTS

First to third embodiments to which the present invention is applied will be explained below with reference to the drawings.

First Embodiment

[Configuration of Vehicle Position Attitude-Angle Estimation System]

Figure 1:
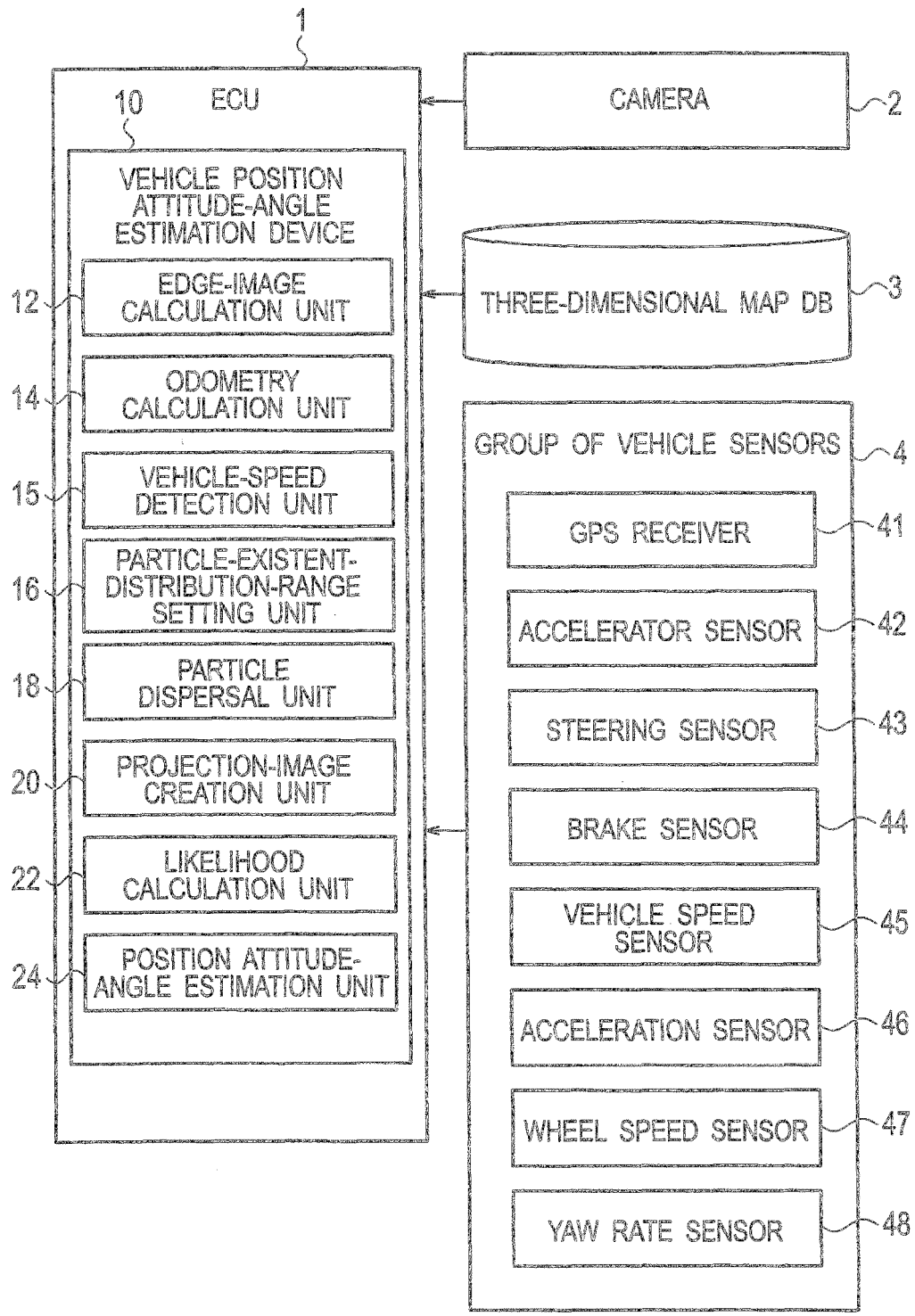
FIG. 1 is a block diagram showing the configuration of a vehicle position attitude-angle estimation system equipped with a vehicle position attitude-angle estimation device according to a first embodiment of the present invention.

FIG. 1 is a block diagram showing the configuration of a vehicle position attitude-angle estimation system equipped with a vehicle position attitude-angle estimation device according to this embodiment. As shown in FIG. 1, the vehicle position attitude-angle estimation system according to this embodiment includes an ECU 1, a camera 2, a three-dimensional map database 3, and a group of vehicle sensors 4.

Here, the ECU 1 is an electronic control unit constituted of an ROM, an RAM, an arithmetic circuit, and the like and includes a vehicle position attitude-angle estimation device 10 according to this embodiment. Note that an ECU used for other control processes may be used also as the ECU 1.

The camera 2 uses a solid-state image sensor such for example as a CCD and, in this embodiment, mounted to the front bumper of a vehicle such that its optical axis is orientated horizontally and the forward view of the vehicle can be captured. The captured images are transmitted to the ECU 1.

In the three-dimensional map database 3, three-dimensional positional information on the edges of the surroundings including road surface markings and the like is stored, for example. In this embodiment, at least three-dimensional information on the positions and orientations of compartment lines, curbs, and the like indicating the ends of roads are recorded and, in addition, edge information on road surface markings such as white lines, stop lines, crosswalk markings, and road surface marks as well as structures such as buildings are included. Note that, as for the data format in the three-dimensional map database 3, pieces of map information on the ends of roads and the like are each defined as a collection of edges. In the case of a straight line with long edges, it is divided for example at a 1-m interval, and there are thus no extremely long edges. In the case of a straight line, each edge holds three-dimensional position information indicating the two opposite end points of the straight line. In the case of a curved line, each edge holds three-dimensional position information indicating the two opposite end points and the center point of the curved line.

The group of vehicle sensors 4 includes a GPS receiver 41, an accelerator sensor 42, a steering sensor 43, a brake sensor 44, a vehicle speed sensor 45, an acceleration sensor 46, wheel speed sensors 47, and a yaw rate sensor 48. The group of vehicle sensors 4 is connected to the ECU 1 and configured to feed various types of detection values detected by the sensors 41 to 48 to the ECU 1. The ECU 1 uses the output values from the group of vehicle sensors 4 to calculate the approximate position of the vehicle and calculate odometry indicating the amount of movement which the vehicle has advanced in a unit time.

The vehicle position attitude-angle estimation device 10 is a device configured to estimate the position and attitude angle of the vehicle by performing matching between an image capturing the surroundings of the vehicle and the three-dimensional map data. By executing a particular program, the vehicle position attitude-angle estimation device 10 operates as an edge-image calculation unit 12, an odometry calculation unit 14, a vehicle-speed detection unit 15, a particle-existent-distribution-range setting unit 16, a particle dispersal unit 18, a projection-image creation unit 20, a likelihood calculation unit 22, and a position attitude-angle estimation unit 24.

The edge-image calculation unit 12 is configured to acquire an image capturing the surroundings of the vehicle from the camera 2 and detect edges from this image to calculate an edge image. In the image captured by the camera 2, at least compartment lines and curbs representing the ends of the road are captured as road surface information necessary to estimate the position and attitude angle of the vehicle. In addition, road surface markings such as white lines, stop lines, crosswalk markings, and road surface marks may be captured in the image as well.

The odometry calculation unit 14 is configured to calculate odometry which is the amount of movement of the vehicle per unit time by using the various sensor values acquired from the group of vehicle sensors 4.

The vehicle-speed detection unit 15 is configured to detect the speed of the vehicle by acquiring the sensor value measured by the vehicle speed sensor 45.

Figure 12:
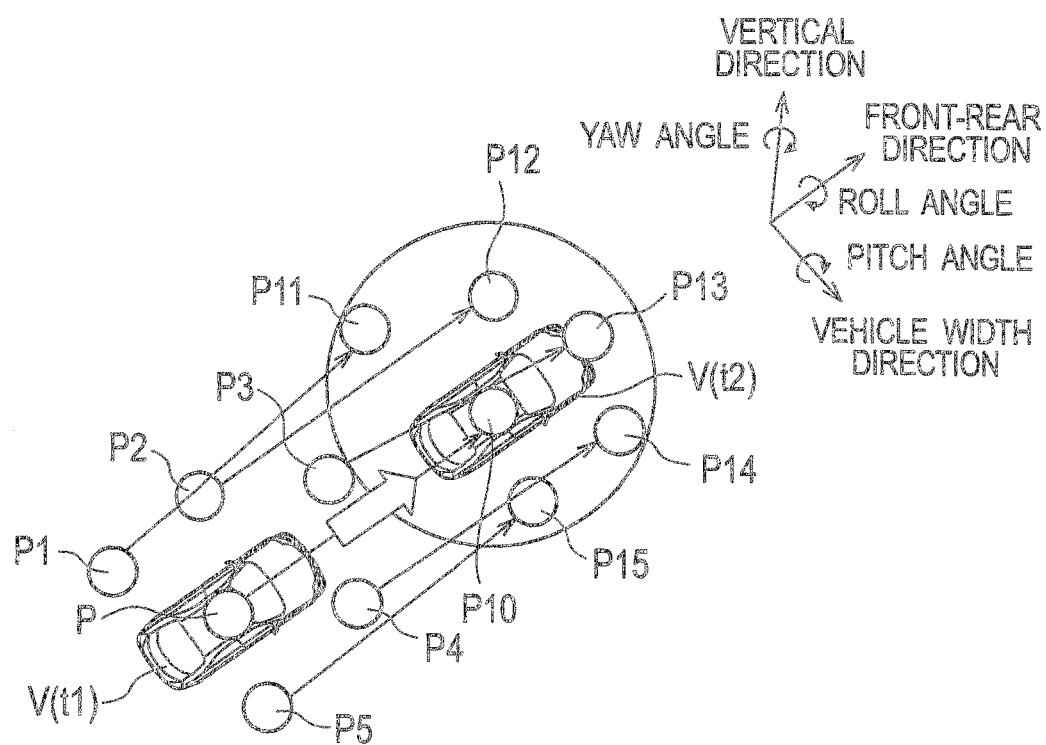
FIG. 12 is a diagram for explaining a method in which a vehicle position attitude-angle estimation device according to the present invention disperses particles.

The particle-existent-distribution-range setting unit 16 is configured to set a predetermined particle existent distribution range in the vicinity of the position and attitude angle moved by the odometry calculated by the odometry calculation unit 14 and correct the particle existent distribution range in accordance with the travel state of the vehicle. Specifically, as shown in FIG. 12, the particle-existent-distribution-range setting unit 16 moves, by the odometry, a particle P at the position and attitude angle of a vehicle V(t1) and particles P1 to P5 therearound which have been estimated in the last loop, and sets and corrects the particle existent distribution range. In this embodiment, when the speed, which represents the travel state of the vehicle, becomes high, the particle-existent-distribution-range setting unit 16 performs correction which widens the particle existent distribution range in the front-rear direction, vehicle width direction, and yaw angle direction of the vehicle.

The particle dispersal unit 18 is configured to disperse particles within the particle existent distribution range set by the particle-existent-distribution-range setting unit 16. As shown in FIG. 12, the particle dispersal unit 18 sets particles P10 to P15 to estimate the position and attitude angle of a new vehicle V(t2).

The projection-image creation unit 20 is configured to create a projection image for each of the particles dispersed by the particle dispersal unit 18. For example, the projection-image creation unit 20 creates the projection image by subjecting the three-dimensional position information on the edges and the like stored in the three-dimensional map database 3 to projection transformation such that the three-dimensional position information is transformed into an image captured by a camera from the position and attitude angle of the particle.

The likelihood calculation unit 22 is configured to calculate likelihood for each particle by comparing the projection image created by the projection-image creation unit 20 and the edge image calculated by the edge-image calculation unit 12. This likelihood is an index indicating how much the position and attitude angle of the particle is likely to be the actual position and attitude angle of the vehicle. The likelihood is set such that the higher the degree of coincidence between the projection image and the edge image, the higher the likelihood.

The position attitude-angle estimation unit 24 is configured to estimate the position and attitude angle of the vehicle based on the likelihood calculated by the likelihood calculation unit 22. For example, the position attitude-angle estimation unit 24 calculates the position and attitude angle of the particle with the highest likelihood as the result of estimation of the actual position and attitude angle of the vehicle.

Note that, in this embodiment, the position and attitude angle of the vehicle are calculated in six degrees of freedom (front-rear direction, vehicle width direction, and vertical direction for the position, and roll, pitch, and yaw for the attitude angle). However, the present technique is also applicable to the estimation of the position and the attitude angle in three degrees of freedom (front-rear direction and transverse direction for the position, and yaw for the attitude angle), for example, for an automated guided vehicle without suspensions and the like that is used in a factory or the like. Specifically, in the case of such a vehicle, the position in the vertical direction and the roll and pitch of the attitude angle are fixed; thus, these parameters may be measured in advance and utilized.

[Procedure of Vehicle Position Attitude-Angle Estimation Process]

Next, the procedure of a vehicle position attitude-angle estimation process according to this embodiment will be explained with reference to a flowchart in FIG. 2. Note that, in this embodiment, the position and attitude angle are estimated in a total of six degrees of freedom—the front-rear direction, the vehicle width direction, and the vertical direction for the position information on the vehicle and the roll, the pitch, and the yaw for the attitude angle information on the vehicle. Here, the roll represents a rotational direction about an axis along the front-rear direction of the vehicle, the pitch represents a rotational direction about an axis along the vehicle width direction of the vehicle, and the yaw represents a rotational direction about an axis along the vertical direction of the vehicle (see FIG. 12).

Also, the vehicle position attitude-angle estimation process to be explained below is performed successively at an interval of about 100 msec, for example.

As shown in FIG. 2, firstly in Step S110, the edge-image calculation unit 12 calculates an edge image from an image of the camera 2. An edge in this embodiment refers to a point at which the brightness of the pixel thereat changes sharply. The Canny method, for example, can be used as the edge detection method. Various other methods such as differential edge detection are usable.

Meanwhile, it is desirable that the edge-image calculation unit 12 extract the directions of changes in brightness of the edges, the colors around the edges, and the like from the image of the camera 2. In this way, in Steps S160 and S170 to be described later, these pieces of information other than the edges recorded in the three-dimensional map database 3 can also be utilized to set the likelihood and calculate the position and attitude angle of the vehicle.

Then in Step S120, the odometry calculation unit 14 calculates the odometry which is the amount of movement of the vehicle to the present since the calculation in Step S120 in the last loop, based on the sensor values acquired from the group of vehicle sensors 4. Note that the odometry calculation unit 14 performs the calculation with the odometry set at zero in the case where the loop is the first loop since the start of the program.

As for the odometry calculation method, assuming that the vehicle's motion is limited on a plane, the odometry calculation unit 14 calculates the amount of turn (angle of turn) in the yaw angle direction from the difference between the encoder values of the wheel speed sensors 47 on the left and right wheels. Then, the amounts of movement in the front-rear direction and the vehicle width direction can be obtained by calculating the average amount of movement from the encoder value of the wheel speed sensor 47 on each wheel and calculating the cosine and sine of the angle of turn in the yaw angle direction for this average amount of movement. Alternatively, the amount of movement and the amount of rotation per unit time may be calculated from the wheel speed of each wheel and the yaw rate. Also, the vehicle speed or the difference between the positional values measured by the GPS receiver 41 may be used in place of the wheel speed, and the steering angle may be used in place of the yaw rate. Note that as the odometry calculation method, various possible calculation methods are available and any method may be used as long as it is capable of calculating the odometry.

In particular, for more accurate calculation of the amounts of movement in the vehicle width direction and the yaw angle direction, the odometry may be calculated based on Ackermann steering geometry (JIDOSHA NO UNDO TO SEIGYO (MOTION AND CONTROL OF AUTOMOBILE), chapter 3, Masato Abe, published by Sankaido Publishing Co., Ltd) when the vehicle speed is in an extremely low speed of, for example, approximately 10 km/h or lower. Moreover, it is even more desirable to calculate the odometry by using an equation of motion of a linear bicycle model that takes the sideslip angle of the tires into consideration (JIDOSHA NO UNDO TO SEIGYO (MOTION AND CONTROL OF AUTOMOBILE), chapter 3, section 3.2.1, P. 56, (3.12) and (3.13), Masato Abe, published by Sankaido Publishing Co., Ltd) when the vehicle speed is higher than the above. Here, each wheel's tire parameter (cornering parameter) needs to be measured in advance in the case of using an equation of motion of a linear bicycle model.

Then in Step S130, the particle-existent-distribution-range setting unit 16 moves the position and attitude angle of each particle estimated in Step S170 in the last loop by the odometry calculated in Step S120 in the current loop. Here, in the case where the loop is the first loop since the start of the program, there is no previous vehicle position information. In this case, data from the GPS receiver 41, which is included in the group of vehicle sensors 4, is used as the initial position information. Alternatively, the last position and attitude angle of the vehicle calculated when the vehicle is stopped last time may be stored and used as the initial position and attitude angle.

The particle-existent-distribution-range setting unit 16 then sets a particle existent distribution range in the vicinity of the position and attitude angle of the vehicle moved by the odometry, while taking the dynamic characteristics and travel state of the vehicle into consideration. In doing so, in this embodiment, taking the travel state of the vehicle into consideration, the particle-existent-distribution-range setting unit 16 widens the particle existent distribution range in the front-rear direction, vehicle width direction, and yaw angle direction of the vehicle when the speed becomes high.

Figure 3A:
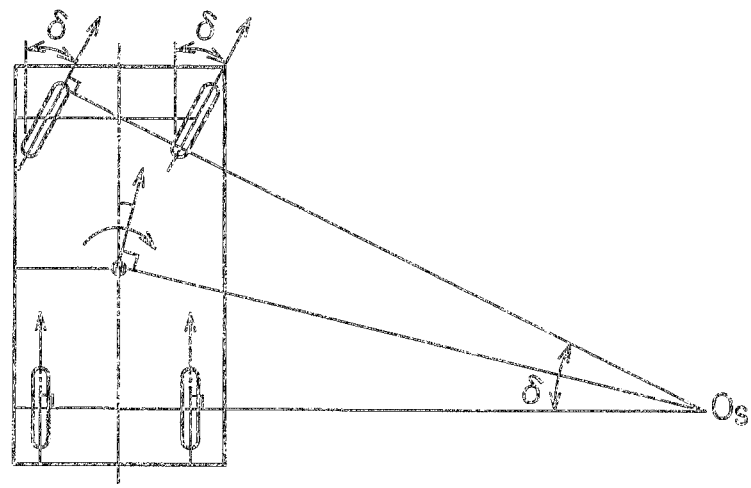
FIGS. 3A and 3B are a set of diagrams schematically illustrating the center of cornering of a vehicle in steady-speed cornering and the sideslip angle of its tires.
Figure 3B:
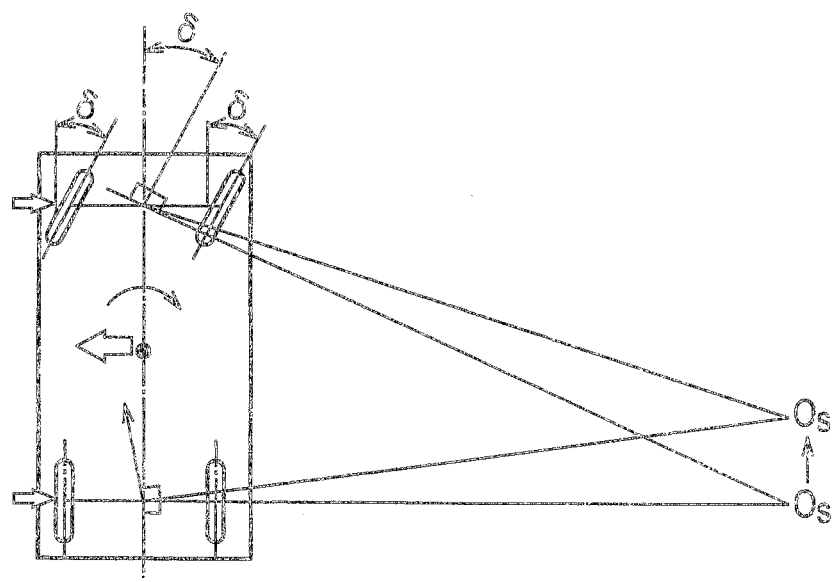

The reason to widen the particle existent distribution range will now be explained with reference to FIGS. 3A and 3B. FIGS. 3A and 3B are a set of diagrams schematically illustrating the center of cornering of a vehicle in steady-speed cornering and the sideslip angle of its tires. FIG. 3A shows a case where the vehicle is in steady-state cornering at extremely low speed while FIG. 3B shows a case where the vehicle is in steady-state cornering that exerts centrifugal force.

As shown in FIG. 3A, at extremely low speed, no centrifugal force is exerted on the vehicle, so that the vehicle advances in the direction of the tires with substantially no movement produced in the vehicle width direction; hence, the odometry is unlikely to have an error in the vehicle width direction.

However, as shown in FIG. 3B, when the vehicle speed becomes high, centrifugal force is exerted on the vehicle, which gives a sideslip angle δ to wheels and thereby produces a motion on the vehicle in the vehicle width direction. For this reason, the odometry is likely to have more errors attributable to the road surface condition, the moving body's individual difference, and the like than when in the extremely-low speed condition. Specifically, vehicle models have such characteristics that as the vehicle speed gets higher, a center of cornering Os changes and in particular the position of the vehicle in the front-rear direction, the position of the vehicle in the vehicle width direction, and the attitude angle of the vehicle in the yaw angle direction are accordingly likely to have errors.

For this reason, when the vehicle speed becomes high, the particle existent distribution range must be widened in the front-rear direction, the vehicle width direction, and the yaw angle direction to be wider than that based on the odometry; otherwise, errors arise and an appropriate particle existent distribution range cannot be set.

In view of this, in this embodiment, when the speed becomes high, the particle existent distribution range is widened in the front-rear direction, vehicle width direction, and yaw angle direction of the vehicle.

The method of widening the particle existent distribution range will be specifically explained below with reference to FIGS. 4 to 6.

Figure 4A:
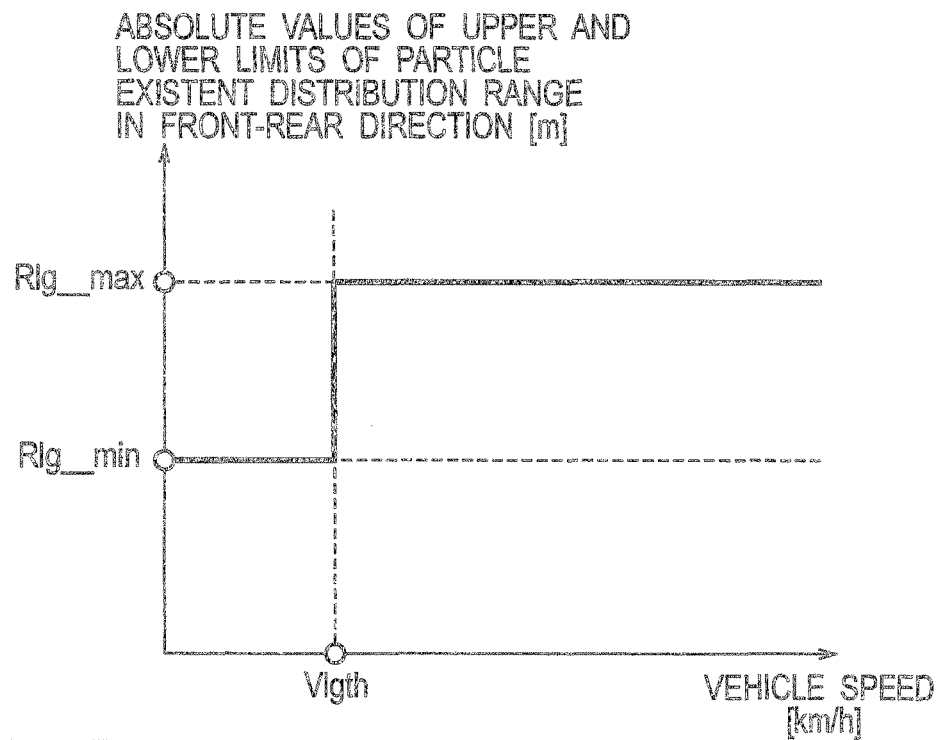
FIGS. 4A and 4B are a set of graphs for explaining a method in which the vehicle position attitude-angle estimation device according to the first embodiment of the present invention widens a particle existent distribution range in the front-rear direction of the vehicle in accordance with speed.

First, the widening of the particle existent distribution range in the front-rear direction of the vehicle will be explained. As shown in FIG. 4A, when the vehicle speed detected by the vehicle-speed detection unit 15 is lower than a threshold Vlgth (km/h), the existent distribution range is set to a range covering ±Rlg_min (m) in the front-rear direction of the vehicle from the position moved by the odometry. When the vehicle speed then reaches or exceeds the threshold Vlgth, the existent distribution range is widened by setting the existent distribution range to a range covering ±Rlg_max (m) in the front-rear direction of the vehicle.

This is done because, as explained with reference to FIGS. 3A and 3B, as the vehicle speed becomes high, the center of cornering of the vehicle moves toward the front of the vehicle and accordingly increases the error in the front-rear direction of the vehicle that is attributable to the road surface condition, the moving body's individual difference, and the like.

Figure 4B:
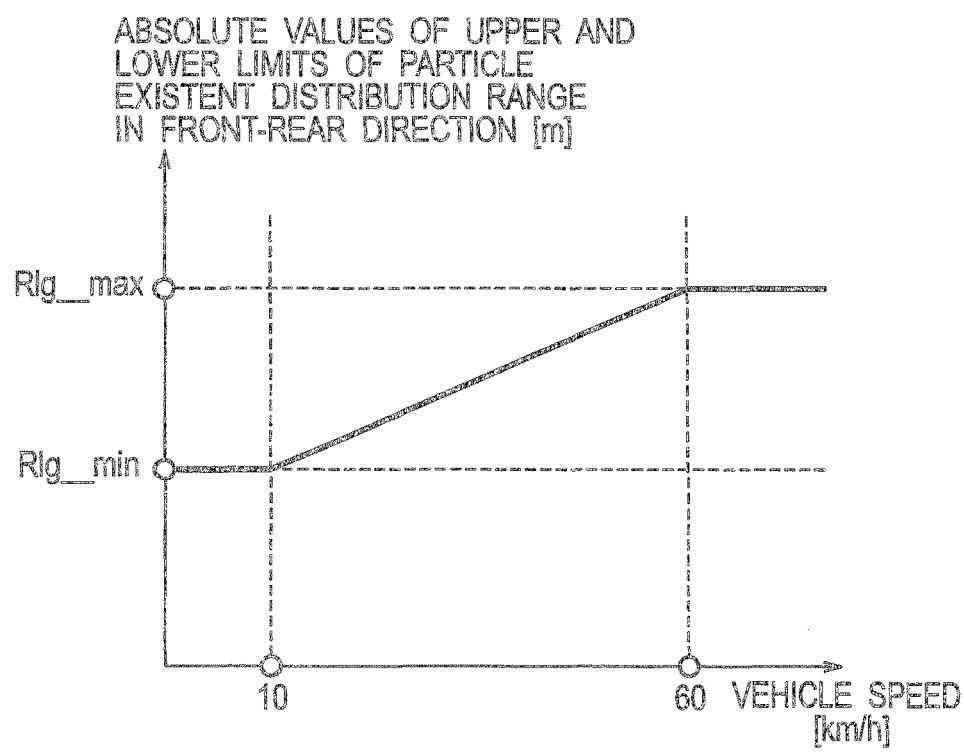

Alternatively, as shown in FIG. 4B, the existent distribution range may be changed in the front-rear direction continuously with the vehicle speed.

Note that, in this embodiment, Vlgth, Rlg_min, and Rlg_max are set, for example, at 20 [km/h], 0.5 [m], and 1.0 [m], respectively. Here, Vlgth is such a speed that the error in the front-rear direction of the vehicle is large. Also, Rlg_min represents a particle existent distribution range at such low speeds that the error in the front-rear direction of the vehicle is small, and is set at an appropriate value calculated in advance via tests and simulations. Rlg_max represents a particle existent distribution range at such high speeds that the error in the front-rear direction of the vehicle is large, and is set at an appropriate value calculated in advance via tests and simulations. Meanwhile, the particle existent distribution range is set as follows in the directions other than the front-rear direction. Specifically, the particle existent distribution range is set to be ±0.5 [m], ±0.1 [m], ±0.5 [deg], ±0.5 [deg], and ±3.0 [deg] in the vehicle width direction, the vertical direction, the roll direction, the pitch direction, and the yaw direction, respectively, from the position and attitude angle moved by the odometry.

Figure 5A:
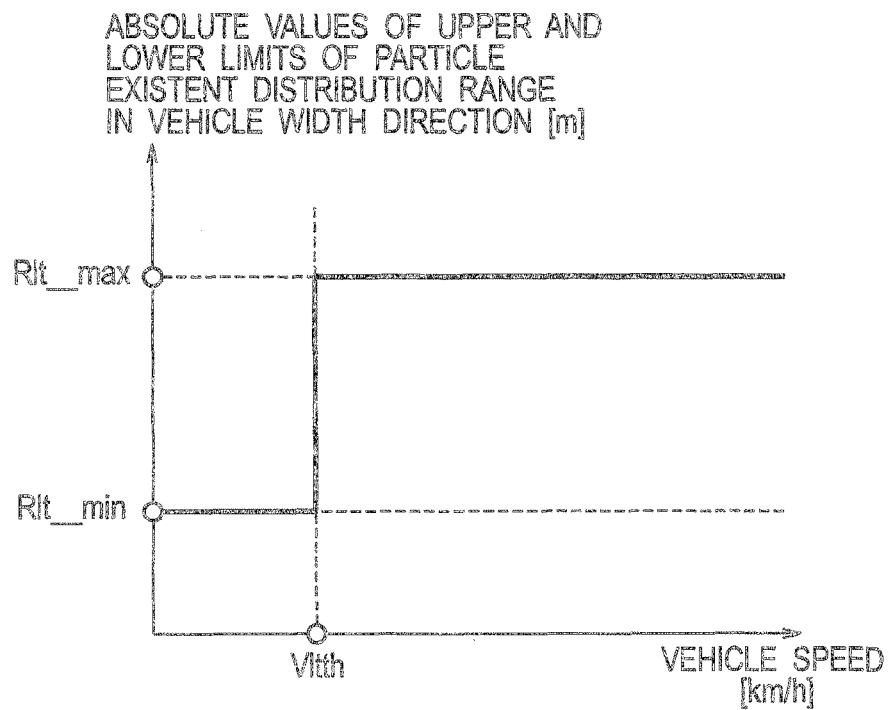
FIGS. 5A and 5B are a set of graphs for explaining a method in which the vehicle position attitude-angle estimation device according to the first embodiment of the present invention widens the particle existent distribution range in the vehicle width direction of the vehicle in accordance with speed.

Next, the widening of the particle existent distribution range in the vehicle width direction of the vehicle will be explained. As shown in FIG. 5A, when the vehicle speed is lower than a threshold Vltth (km/h), the existent distribution range is set to a range covering ±Rlt_min (m) in the vehicle width direction of the vehicle from the position moved by the odometry. When the vehicle speed then reaches or exceeds the threshold Vltth, the existent distribution range is widened by setting the existent distribution range to a range covering ±Rlt_max (m) in the vehicle width direction of the vehicle.

This is done because, as explained with reference to FIGS. 3A and 3B, when the vehicle speed becomes high, a motion is produced on the vehicle in the vehicle width direction during cornering, which does not occur when the vehicle speed is extremely low, and increases the error in the vehicle width direction of the vehicle that is attributable to the road surface condition, the moving body's individual difference, and the like.

Figure 5B:
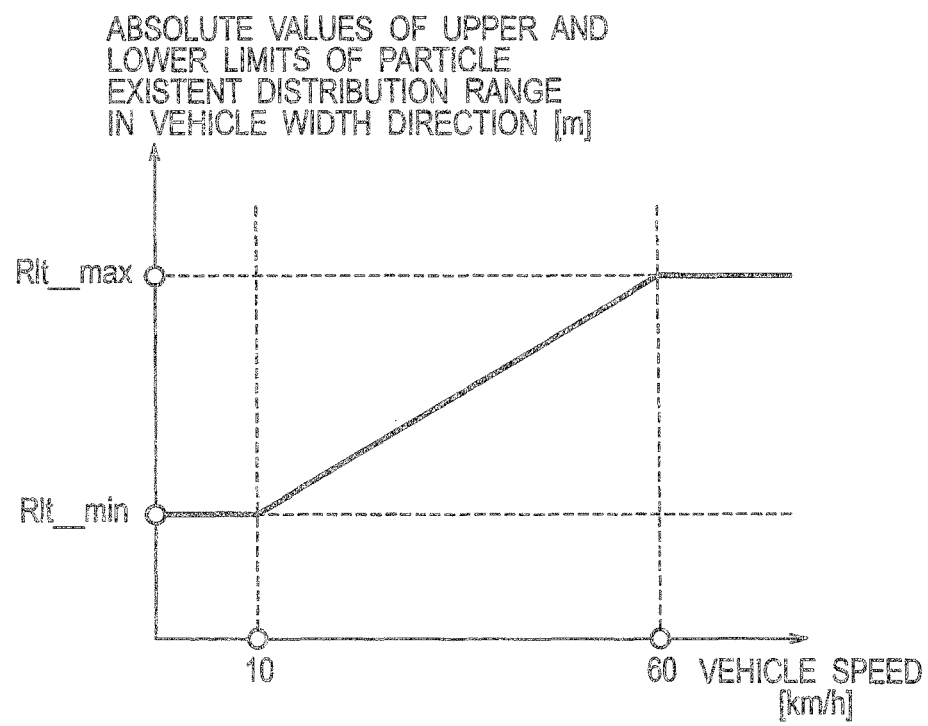

Alternatively, as shown in FIG. 5B, the existent distribution range may be changed in the vehicle width direction continuously with the vehicle speed.

Note that, in this embodiment, Vltth, Rlt_min, and Rlt_max are set, for example, at 20 [km/h], 0.2 [m], and 0.5 [m], respectively. Here, Vltth is such a speed that centrifugal force is exerted on the vehicle, thereby giving a sideslip angle to the wheels and producing a motion on the vehicle in the vehicle width direction. Also, Rlt_min represents a particle existent distribution range at such low speeds that no motion is produced on the vehicle in the vehicle width direction, and is set at an appropriate value calculated in advance via tests and simulations. Rlt_max represents a particle existent distribution range at such high speeds that a motion is produced on the vehicle in the vehicle width direction, and is set at an appropriate value calculated in advance via tests and simulations.

Figure 6A:
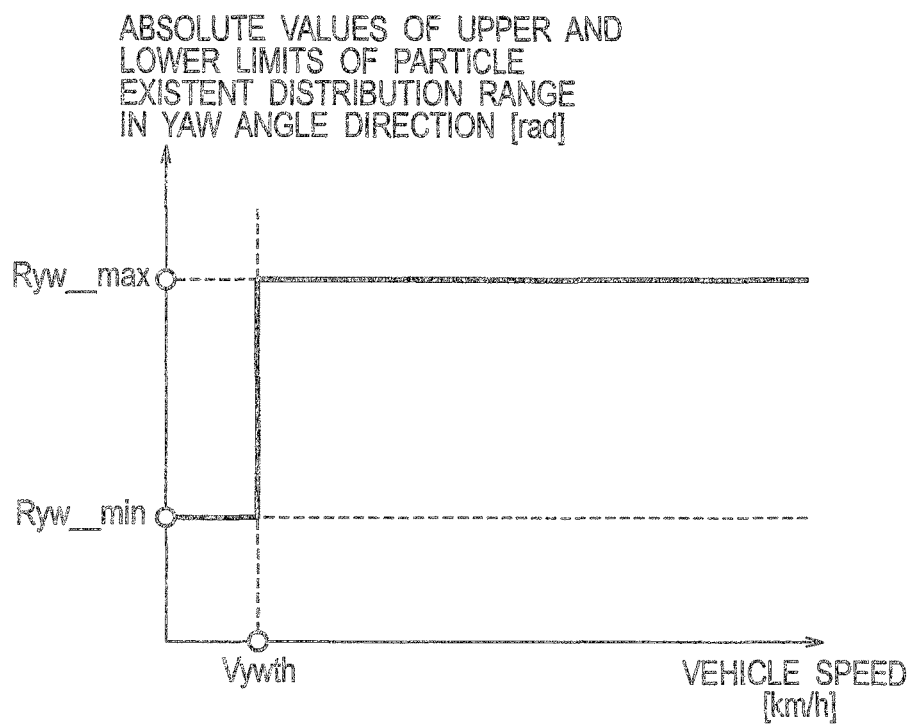
FIGS. 6A and 6B are a set of graphs for explaining a method in which the vehicle position attitude-angle estimation device according to the first embodiment of the present invention widens the particle existent distribution range in the yaw angle direction of the vehicle in accordance with speed.

Next, the widening of the particle existent distribution range in the yaw angle direction will be explained. As shown in FIG. 6A, when the vehicle speed is lower than a threshold Vywth (km/h), the existent distribution range is set to a range covering ±Ryw_min (rad) in the yaw angle direction of the vehicle from the attitude angle moved by the odometry. When the vehicle speed then reaches or exceeds the threshold Vywth, the existent distribution range is widened by setting the existent distribution range to a range covering ±Ryw_max (rad) in the yaw angle direction of the vehicle.

This is done because, as explained with reference to FIGS. 3A and 3B, as the vehicle speed becomes high, the center of cornering of the vehicle moves toward the front of the vehicle and accordingly increases the error in the yaw angle direction of the vehicle that is attributable to the road surface condition, the moving body's individual difference, and the like.

Figure 6B:
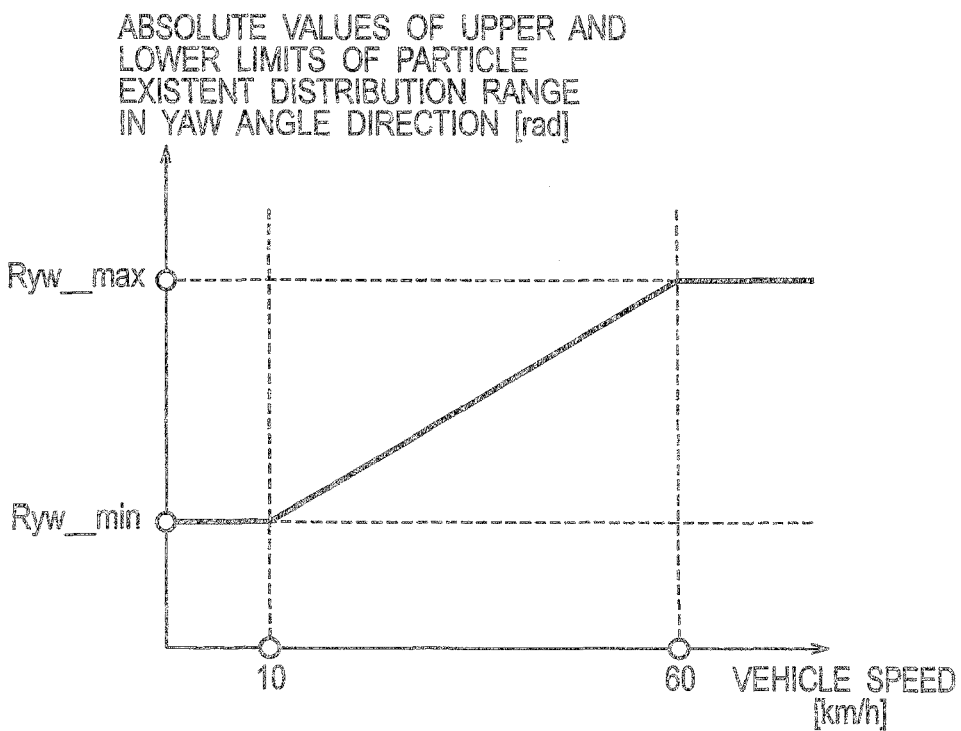

Alternatively, as shown in FIG. 6B, the existent distribution range may be changed in the yaw angle direction continuously with the vehicle speed.

Note that, in this embodiment, Vywth, Ryw_min, and Ryw_max are set, for example, at 10 [km/h], 0.02 [rad], and 0.05 [rad], respectively. Here, Vywth is such a speed that centrifugal force is exerted on the vehicle, thereby giving a sideslip angle to each wheel and producing a motion on the vehicle in the yaw angle direction. Also, Ryw_min represents a particle existent distribution range at such low speeds that no motion is produced on the vehicle in the yaw angle direction, and is set at an appropriate value calculated in advance via tests and simulations. Ryw_max represents a particle existent distribution range at such high speeds that a motion is produced on the vehicle in the yaw angle direction, and is set at an appropriate value calculated in advance via tests and simulations.

Then in Step S140, the particle dispersal unit 18 disperses particles within the existent distribution range set in Step S130. As for the dispersal method, the particle dispersal unit 18 randomly sets particles within the range (upper and lower limits) set in Step S130 by using a random number table or the like for each of the parameters in the six degrees of freedom, which define the particle position and attitude angle. Meanwhile, 500 particles are always created in this embodiment.

Note that particles may be dispersed using the technique disclosed in Patent Japanese Patent Application Publication No. 2010-224755. In that case, the process may involve: calculating how much the position and attitude angle of the vehicle moved by the odometry in Step S130 are corrected by means of the position and the attitude angle calculated in Step S170; setting a mean and a distribution for the dispersal of particles in accordance with these amounts of correction; and then dispersing particles accordingly. In doing so, the existent distribution range set in Step S130 is used as the range within which to disperse particles. Also, an existent distribution range may also be calculated using the technique disclosed in Japanese Patent Application Publication No. 2010-224755. Both this existent distribution range and the existent distribution range set in Step S130 may be used as the range within which to disperse particles. Further, the number of particles to be dispersed may also be determined dynamically in accordance with the existent distribution range set in Step S130 by using the technique disclosed in Japanese Patent Application Publication No. 2010-224755.

Then in Step S150, the projection-image creation unit 20 creates a projection image (virtual image) for each of the plurality of particles dispersed in Step S140. In doing so, for example, the three-dimensional position information on the edges and the like stored in the three-dimensional map database 3 is subjected to projection transformation into a camera image for each predicted position and candidate attitude angle, so that a projection image for evaluation is created. A group of evaluation points projected on this projection image are compared in Step S160 to be described later with the edges on the edge image calculated in Step S110.

Meanwhile, the projection transformation requires an external parameter indicating the position of the camera 2 and the internal parameters of the camera 2. The external parameter may be calculated from the predicted position and the candidate attitude angle by measuring the relative position from the vehicle to the camera 2 in advance, while the internal parameters may be calibrated in advance.

Note that in the case where the directions of changes in brightness of the edges, the colors around the edges, and the like have been extracted from the camera image in Step S110, it is desirable to create the projection image by using them.

Then in Step S160, for each of the plurality of particles dispersed in Step S140, the likelihood calculation unit 22 compares the edge image calculated in Step S110 and the projection image created in Step S150. Then, based on the comparison result, the likelihood calculation unit 22 calculates likelihood for each of the particles which represent predicted positions and candidate attitude angles. This likelihood is an index indicating how much the predicted position and candidate attitude angle are likely to be the actual position and attitude angle of the vehicle. The likelihood calculation unit 22 sets the likelihood such that the higher the degree of coincidence between the projection image and the edge image, the higher the likelihood. An example of how to calculate this likelihood will be explained below.

First, a pixel position on the projection image is located, and whether or not an edge is present at this pixel position is determined. Then, whether or not an edge is present at the same position on the edge image as the pixel position on the projection image is determined. If these positions coincide with each other in terms of the present or absence of an edge, a likelihood value (unit: n/a) of 1 is set, and if not, a likelihood value of 0 is set. This operation is performed for all the evaluation points, and the sum thereof, or the number of coinciding evaluation points, is determined as the likelihood. Once the likelihood is calculated for each of the particles which represent all the predicted positions and candidate attitude angles, the likelihood of each particle is normalized such that the sum thereof can be equal to 1. Note that, as the likelihood calculation method, many other possible calculation methods are available and any of these may be used.

Then in Step S170, the position attitude-angle estimation unit 24 calculates the final position and attitude angle of the vehicle by using the plurality of predicted positions and candidate attitude angles possessing the likelihood information calculated in Step S160. For example, the position attitude-angle estimation unit 24 calculates the predicted position and candidate attitude angle with the highest likelihood as the actual position and attitude angle of the vehicle. Alternatively, the position attitude-angle estimation unit 24 may calculate a weighted mean of the predicted positions and the attitude angles by using the likelihood of each predicted position and candidate attitude angle, and set these values as the final position and attitude angle of the vehicle. Once the result of estimation of the position and attitude angle of the vehicle is thus calculated, the vehicle position attitude angle estimation process according to this embodiment is terminated.

In this embodiment, the position and attitude angle of the vehicle are estimated through matching between an image captured by the camera 2 mounted to the vehicle and the three-dimensional map database 3. Note, however, that the position and attitude angle of the vehicle may be estimated using values measured by a laser sensor as disclosed in Japanese Patent Application Publication No. 2010-224755.

In that case, for example, position information on pole-shaped obstacles such as utility poles whose azimuth and distance to the vehicle can be measured with the laser sensor and information on the positions and shapes of structures such as buildings and fences around the road are included in the three-dimensional map database 3 in the form of an occupancy grid map.

This occupancy grid map expresses a map by partitioning the environment into small cells in a matrix and adding an occupancy probability to each cell indicating whether the cell is occupied by an obstacle (Probabilistic Robotics, chapter 9, published by Mainichi Communications Inc.).

Then, in Step S150 in the flowchart in FIG. 2, for each particle, how the obstacles and the structures stored in the three-dimensional map database 3 would be situated if the vehicle were present at the position and attitude angle of the particle is calculated and projected on the occupancy grid map.

After that, in Step S160 in the flowchart in FIG. 2, for each particle, the likelihood is calculated by counting how many of the cells occupied by the obstacles and the structures stored in the three-dimensional map database 3 are detected on the occupancy grid map by the laser sensor.

As described above, the position and the attitude angle may be estimated by changing the operations in Steps S150 and S160 in the flowchart in FIG. 2 or by using the method described in Probabilistic Robotics, chapter 8 (published by Mainichi Communications Inc.).

Advantageous Effects of First Embodiment

As explained above in detail, the vehicle position attitude-angle estimation device according to this embodiment is such that the particle existent distribution range is widened in the vehicle width direction of the vehicle when the speed of the vehicle becomes high. In this way, even when the speed of the vehicle becomes high, thus producing a movement on the vehicle in the vehicle width direction, the particle existent distribution range can be set appropriately and the position and attitude angle of the vehicle can therefore be estimated accurately.

Also, the vehicle position attitude-angle estimation device according to this embodiment is such that the particle existent distribution range is widened in the yaw angle direction of the vehicle when the speed of the vehicle becomes high. In this way, even when the speed of the vehicle becomes high, thus producing a movement on the vehicle in the yaw angle direction, the particle existent distribution range can be set appropriately and the position and attitude angle of the vehicle can therefore be estimated accurately.

Second Embodiment

Next, a vehicle position attitude-angle estimation device according to a second embodiment of the present invention will be explained with reference to drawings.

[Configuration of Vehicle Position Attitude-Angle Estimation System]

Figure 7:
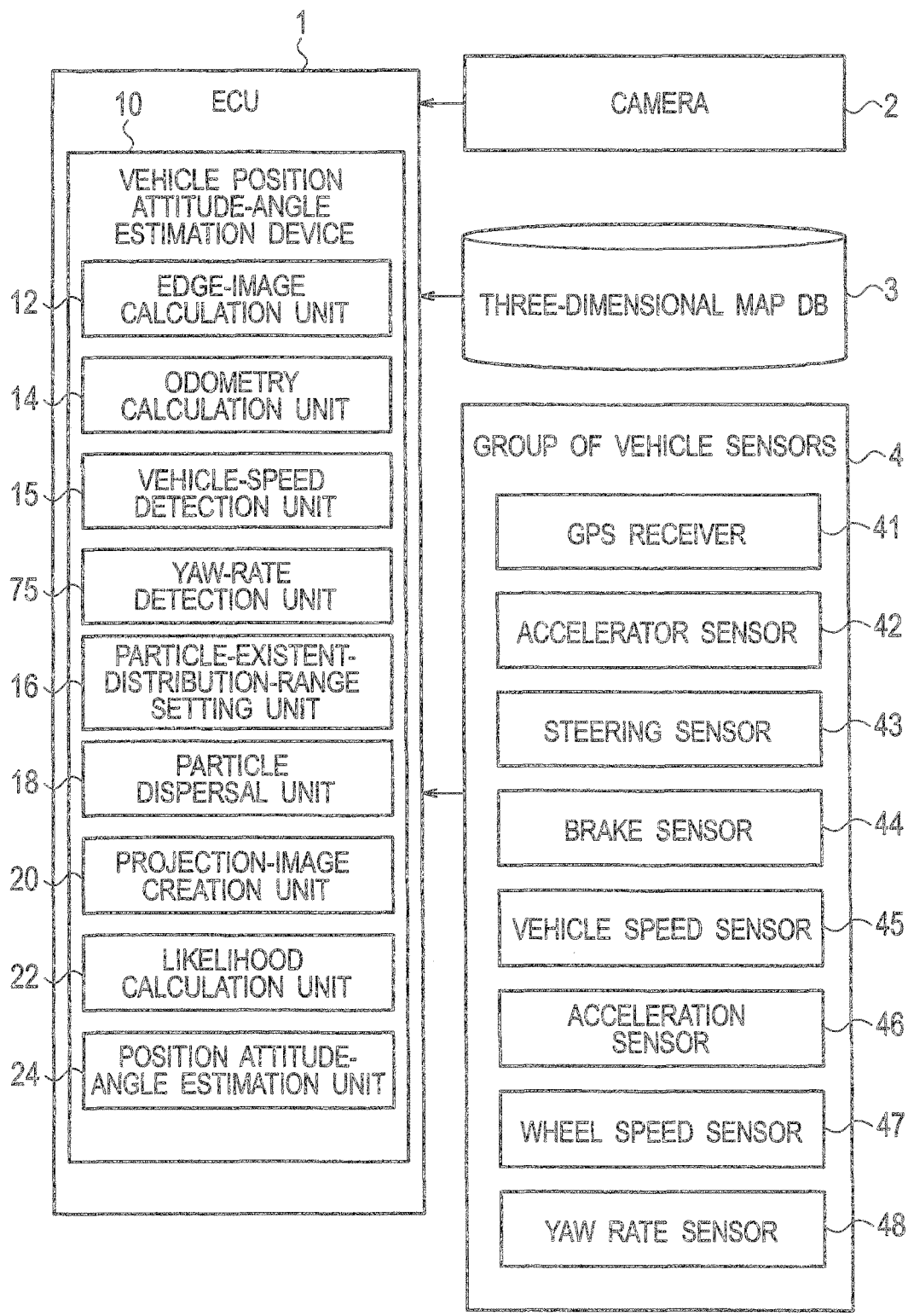
FIG. 7 is a block diagram showing the configuration of a vehicle position attitude-angle estimation system equipped with a vehicle position attitude-angle estimation device according to a second embodiment of the present invention.

FIG. 7 is a block diagram showing the configuration of a vehicle position attitude-angle estimation system equipped with the vehicle position attitude-angle estimation device according to this embodiment. As shown in FIG. 7, a vehicle position attitude-angle estimation device 10 according to this embodiment differs from that in the first embodiment in that it further includes a yaw-rate detection unit 75. Note that the other features are the same as those in the first embodiment and will therefore be denoted by the same reference numerals, and detailed explanation thereof will be omitted.

The yaw-rate detection unit 75 is configured to detect the yaw rate, which is the rate of change of the vehicle in the yaw angle direction, by acquiring the sensor value measured by the yaw rate sensor 48.

[Procedure of Vehicle Position Attitude Angle Estimation Process]

The vehicle position attitude angle estimation process according to this embodiment differs from that in the first embodiment in the method of setting the particle existent distribution range, which is performed in Step S130 in FIG. 2. The difference is that while the particle existent distribution range is set in accordance with the speed of the vehicle in the first embodiment, the particle existent distribution range is set in accordance with the yaw rate of the vehicle in this embodiment.

In Step S130 in FIG. 2, the particle-existent-distribution-range setting unit 16 moves the position and attitude angle of each particle in the last loop by the odometry. Then, the particle-existent-distribution-range setting unit 16 sets a particle existent distribution range in the vicinity of the position and attitude angle of the vehicle thus moved and, in this embodiment, widens the particle existent distribution range in the vehicle width direction and yaw angle direction of the vehicle when the yaw rate of the vehicle becomes high.

Figure 8C:
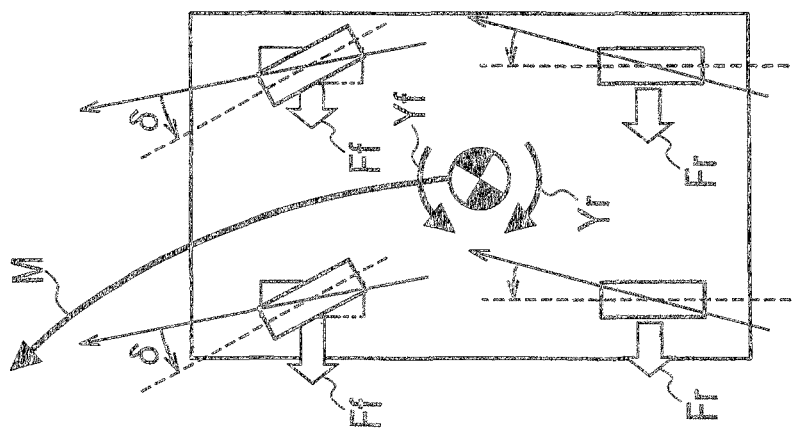
FIGS. 8A-8C are a set of diagrams for explaining tire side force and yaw moment generated when the vehicle is turned.
Figure 8B:
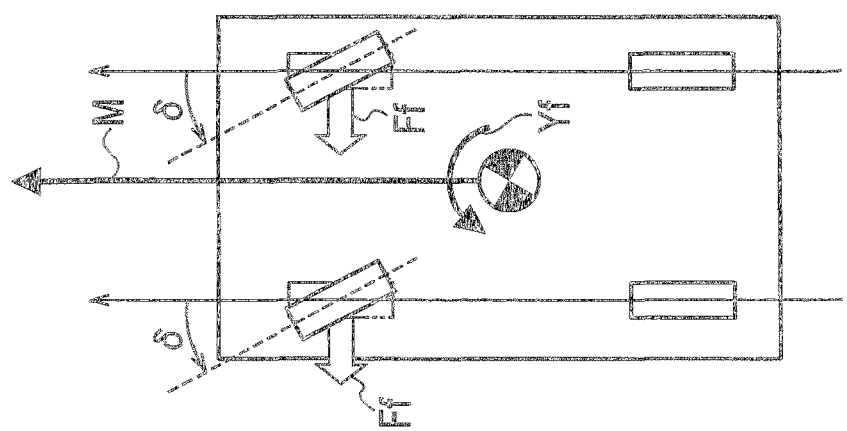
Figure 8A:
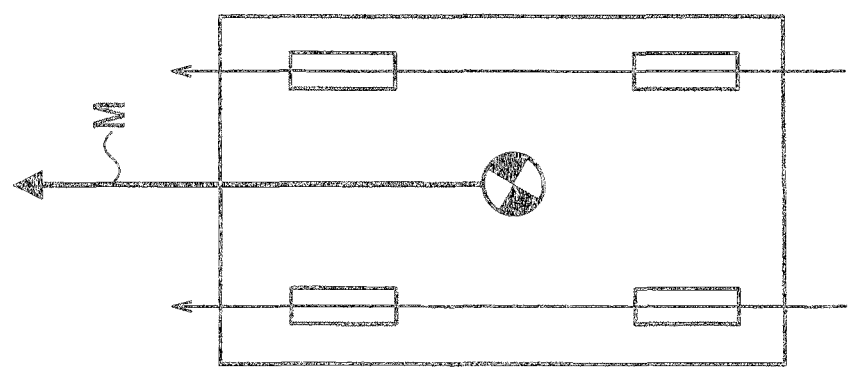

The reason to widen the particle existent distribution range when the yaw rate of the vehicle becomes high will now be explained with reference to FIGS. 8A-8C. FIGS. 8A-8C are a set of diagrams showing tire side force and yaw moment generated when the vehicle is turned. FIG. 8A shows the vehicle advancing straight, FIG. 8B shows the vehicle immediately after turning the front wheels, and FIG. 8C shows the vehicle in steady-state cornering.

Assume that while the vehicle is advancing in an advancing direction M with the steering wheel of the vehicle fixed at the neutral position as shown in FIG. 8A, the steering wheel is turned at such a high vehicle speed that a sideslip angle δ will be given to wheels as explained with reference to FIG. 3B. As a result, as shown in FIG. 8B, the sideslip angle δ is given firstly to the front wheels immediately after the turning and a tire side force Ff is produced on the front wheels. This tire side force Ff in turn generates a yaw moment Yf and cornering starts. In this state, the motion in the yaw angle direction is dominant, and therefore the attitude angle is likely to have an error in the yaw angle direction.

As the turned state in FIG. 8B is maintained, the yaw moment Yf by the tire side force Ff from the front wheels and a yaw moment Yr by a tire side force Fr from the rear wheels come to equilibrium as shown in FIG. 8C. As a result, the yaw rate stops increasing and a steady-state cornering state is reached. In this state, in addition to the motion of the vehicle in the yaw angle direction, the acceleration in the vehicle width direction is large, and therefore the position is likely to have an error in the vehicle width direction as well.

For this reason, when the vehicle is turned such that the yaw rate is high, the particle existent distribution range must be widened in the vehicle width direction and yaw angle direction of the vehicle; otherwise, errors arise and an appropriate particle existent distribution range cannot be set.

In view of this, in this embodiment, when the yaw rate becomes high, the particle existent distribution range is widened in the vehicle width direction and yaw angle direction of the vehicle.

The method of widening the particle existent distribution range will be specifically explained below with reference to FIGS. 9A and 9B.

Figure 9A:
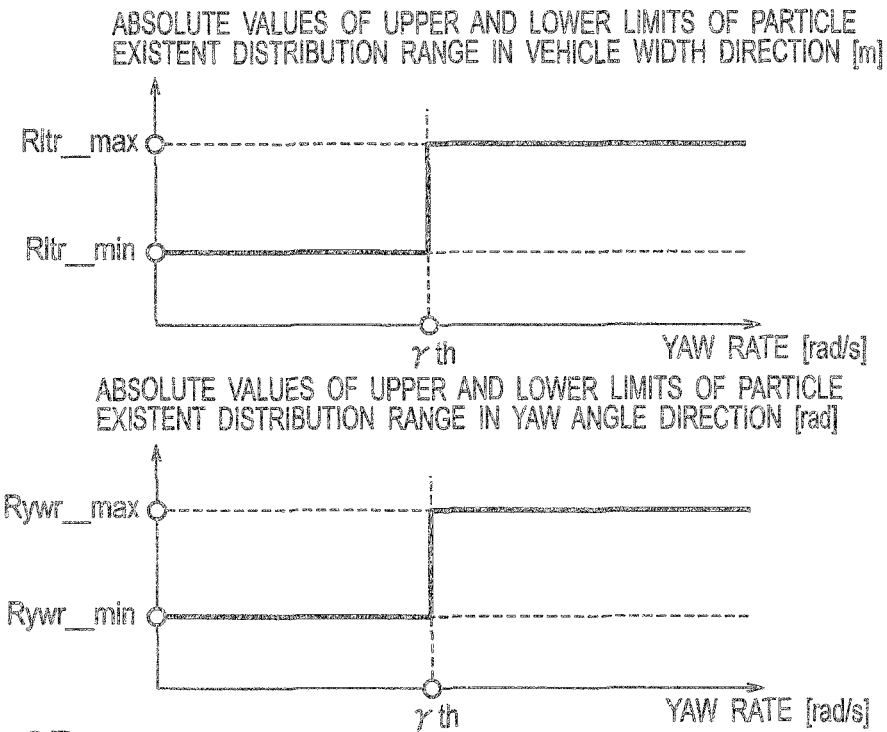
FIGS. 9A and 9B are a set of graphs for explaining a method in which the vehicle position attitude-angle estimation device according to the second embodiment of the present invention widens a particle existent distribution range in the vehicle width direction and yaw angle direction of a vehicle in accordance with yaw rate.

As shown in FIG. 9A, when the yaw rate detected by the yaw-rate detection unit 75 is lower than a threshold γth (rad/s), the existent distribution range is set to a range covering ±Rltr_min (m) in the vehicle width direction from the position moved by the odometry. Also, the existent distribution range is set to a range covering ±Rywr_min (rad) in the yaw angle direction from the attitude angle moved by the odometry. When the yaw rate then reaches or exceeds the threshold γth, the existent distribution range is widened by setting the existent distribution range to a range covering ±Rltr_max (m) in the vehicle width direction and ±Rywr_max (rad) in the yaw angle direction.

This is done because, as explained with reference to FIG. 8, as the yaw rate and the acceleration in the vehicle width direction become high, a sideslip angle is produced on wheels and the position and the attitude angle calculated by the odometry are likely to have errors. In view of this, in this embodiment, the existent distribution range is set wider by taking into consideration the increase in the errors in the vehicle width direction and the yaw angle direction that are attributable to the road surface condition, the moving body's individual difference, and the like.

Figure 9B:
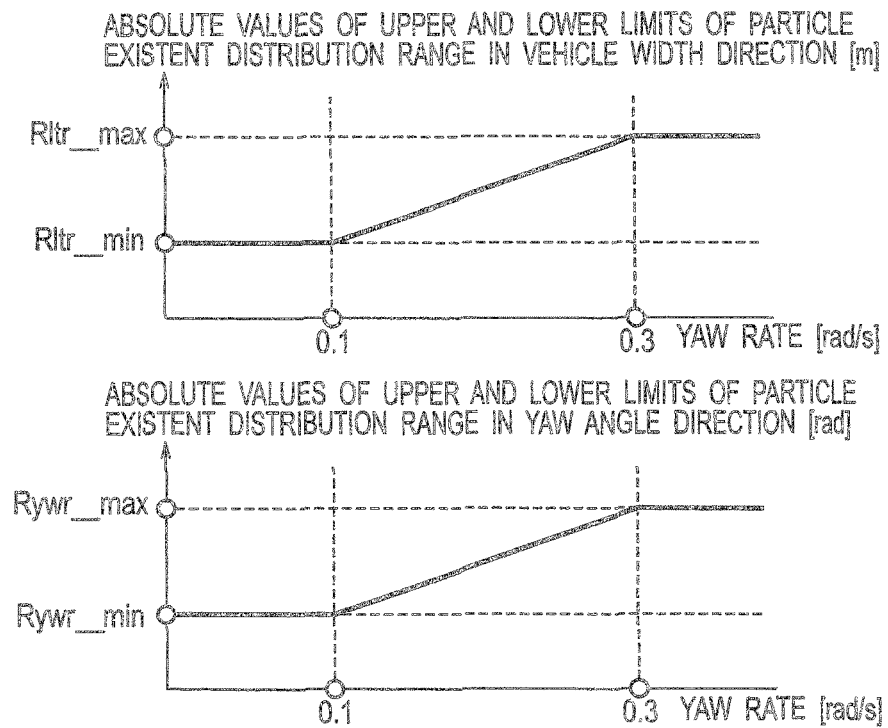

Alternatively, as shown in FIG. 9B, the existent distribution range may be changed continuously with the yaw rate.

Note that, in this embodiment, yth, Rltr_min, Rltr_max, Rywr_min, and Rywr_max are set, for example, at 0.15 [rad/s], 0.2 [m], 0.5 [m], 0.02 [rad], and 0.05 [rad], respectively. Here, γth is such a yaw rate that the turning of the vehicle produces motions in the yaw angle direction and vehicle width direction of the vehicle. Also, Rltr_min and Rywr_min represent particle existent distribution ranges at such low yaw rates that no motions are produced on the vehicle in the vehicle width direction and the yaw angle direction, and are set at appropriate values calculated in advance via tests and simulations. Rltr_max and Rywr_max represent particle existent distribution ranges at such high yaw rates that motions are produced on the vehicle in the vehicle width direction and the yaw angle direction, and are set at appropriate values calculated in advance via tests and simulations.

Further, the particle existent distribution range can also be set using both the method of this embodiment and the method of the first embodiment. In that case, in each direction, the larger upper and lower limit values may be used to set the existent distribution range.

Also, the particle-existent-distribution-range setting unit 16 according to this embodiment controls the particle existent distribution range such that, when the yaw rate of the vehicle becomes high, the particle existent distribution range is widened in the vehicle width direction of the vehicle after the elapse of a predetermined period of time following the widening of the particle existent distribution range in the yaw angle direction of the vehicle. For example, the particle-existent-distribution-range setting unit 16 widens the particle existent distribution range in the vehicle width direction with a first lag of a time constant of 0.5 [s] after the widening of the particle existent distribution range in the yaw angle direction.

This is done because, as explained with reference to FIG. 8, the position of the vehicle in the vehicle width direction changes with a lag following the attitude angle in the yaw angle direction.

Since the existent distribution range is widened in the vehicle width direction with a lag following the widening of the existent distribution range in the yaw angle direction as described above, the particle existent distribution range can be appropriately set in conformity with the change in the position of the vehicle in the vehicle width direction that occurs with a lag following the attitude angle in the yaw angle direction.

Note that the movement of the vehicle in the yaw angle direction has a lag in response to the driver's steering operation due to the steering mechanism and the tire side force. To address this, the timing to widen the particle existent distribution range in the yaw angle direction in response to steering operation may be delayed. Specifically, the particle existent distribution range may be widened in the yaw angle direction with a first lag of a time constant of, for example, 0.2 [s] upon operation of the steering by the driver.

Advantageous Effects of Second Embodiment

As explained above in detail, the vehicle position attitude-angle estimation device according to this embodiment is such that the particle existent distribution range is widened in the yaw angle direction of the vehicle when the yaw rate of the vehicle becomes high. In this way, even when the yaw rate of the vehicle becomes high, thus producing a movement on the vehicle in the yaw angle direction, the particle existent distribution range can be set appropriately and the position and attitude angle of the vehicle can therefore be estimated accurately.

Also, the vehicle position attitude-angle estimation device according to this embodiment is such that, when the yaw rate of the vehicle becomes high, the particle existent distribution range is widened in the vehicle width direction of the vehicle after the elapse of a predetermined period of time following the widening of the particle existent distribution range in the yaw angle direction of the vehicle. In this way, the particle existent distribution range can be appropriately set in conformity with the change in the position of the vehicle in the vehicle width direction that occurs with a lag following the attitude angle in the yaw angle direction.

Third Embodiment

Next, a vehicle position attitude-angle estimation device according to a third embodiment of the present invention will be explained with reference to drawings.

[Configuration of Vehicle Position Attitude-Angle Estimation System]

Figure 10:
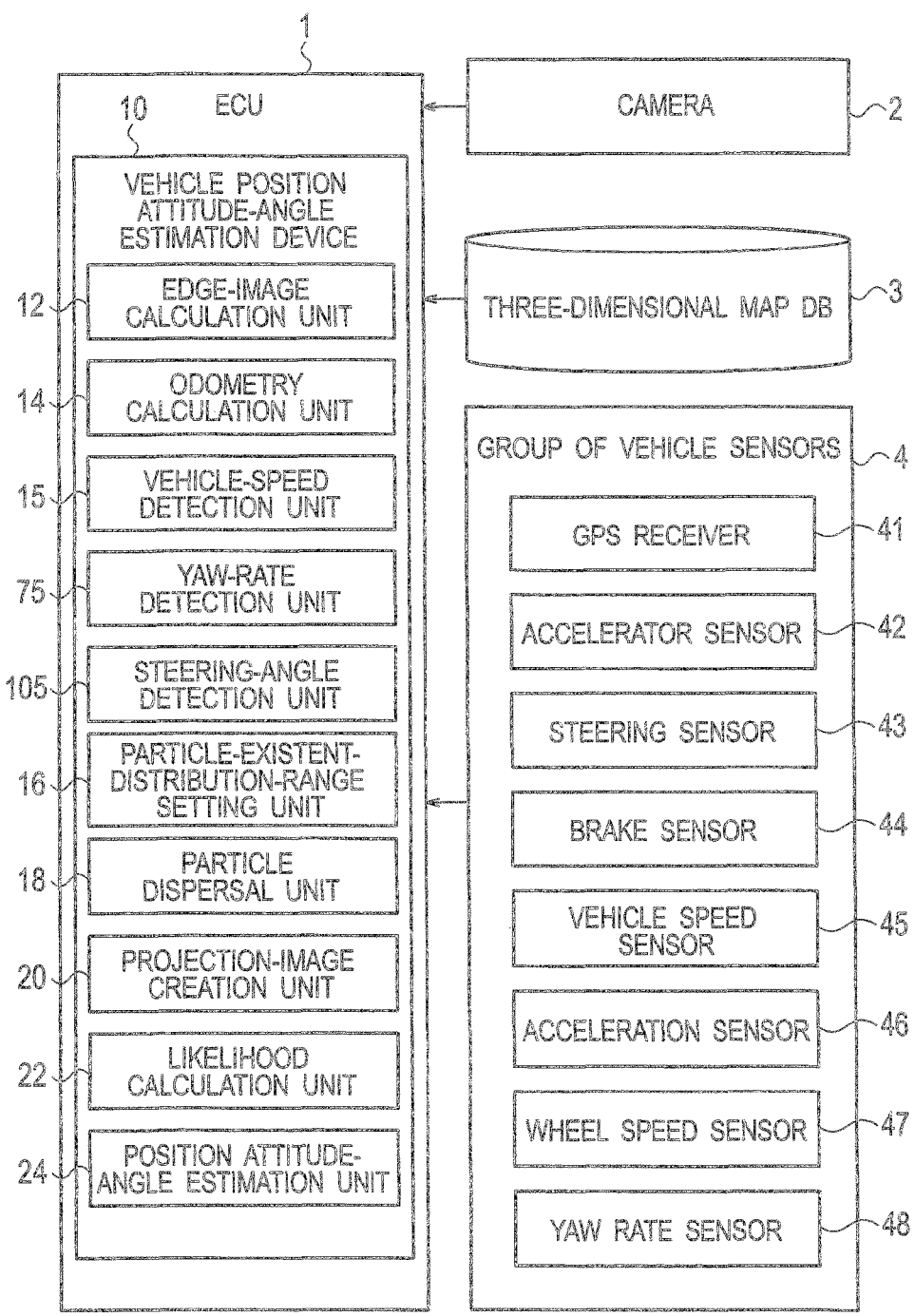
FIG. 10 is a block diagram showing the configuration of a vehicle position attitude-angle estimation system equipped with a vehicle position attitude-angle estimation device according to a third embodiment of the present invention.

FIG. 10 is a block diagram showing the configuration of a vehicle position attitude-angle estimation system equipped with the vehicle position attitude-angle estimation device according to this embodiment. As shown in FIG. 10, a vehicle position attitude-angle estimation device 10 according to this embodiment differs from that in the first embodiment in that it further includes a steering-angle detection unit 105. Note that the other features are the same as those in the second embodiment and will therefore be denoted by the same reference numerals, and detailed explanation thereof will be omitted.

The steering-angle detection unit 105 is configured to detect the steering angle of the vehicle by acquiring the sensor value measured by the steering sensor 43.

[Procedure of Vehicle Position Attitude Angle Estimation Process]

The vehicle position attitude angle estimation process according to this embodiment differs from that in the first embodiment in the method of setting the particle existent distribution range, which is performed in Step S130 in FIG. 2. The difference is that while the particle existent distribution range is set in accordance with the speed of the vehicle in the first embodiment, the particle existent distribution range is set in accordance with the steering operation angle of the vehicle in this embodiment.

In Step S130 in FIG. 2, the particle-existent-distribution-range setting unit 16 moves the position and attitude angle of each particle in the last loop by the odometry. Then, the particle-existent-distribution-range setting unit 16 sets a particle existent distribution range in the vicinity of the position and attitude angle of the vehicle thus moved and widens the particle existent distribution range in the front-rear direction, vehicle width direction, and yaw angle direction of the vehicle when the steering operation angle of the vehicle becomes large.

The method of widening the particle existent distribution range will be specifically explained below with reference to FIGS. 11A and 11B.

Figures 11A, 11B:
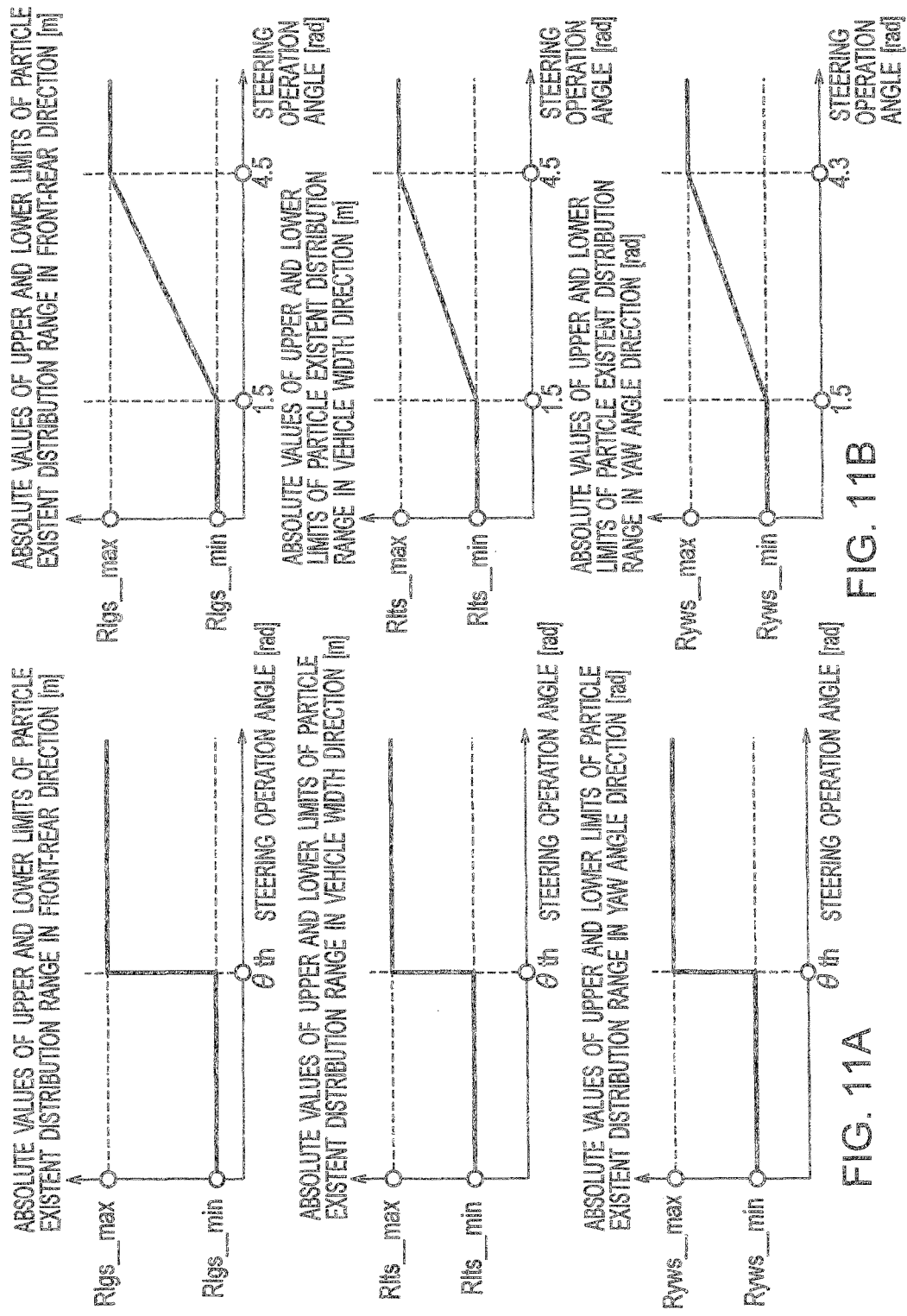
FIGS. 11A and 11B are a set of graphs for explaining a method in which the vehicle position attitude-angle estimation device according to the third embodiment of the present invention widens a particle existent distribution range in the front-rear direction, vehicle width direction, and yaw angle direction of a vehicle in accordance with steering operation angle.

As shown in FIG. 11A, when the steering operation angle detected by the steering-angle detection unit 105 is smaller than a threshold θth, the existent distribution range is set to a range covering ±Rlgs_min (m) in the front-rear direction of the vehicle and ±Rlts_min (m) in the vehicle width direction from the position moved by the odometry. Also, the existent distribution range is set to a range covering ±Ryws_min (rad) in the yaw angle direction from the attitude angle moved by the odometry. When the steering operation angle then reaches or exceeds the threshold θth, the existent distribution range is widened by setting the existent distribution range to a range covering ±Rlgs_max (m) in the front-rear direction of the vehicle and ±Rlts_max (m) in the vehicle width direction. Also, the existent distribution range is widened by setting the existent distribution range to a range covering ±Ryws_max (rad) in the yaw angle direction.

This is done because, as explained with reference to FIG. 8, as the yaw rate and the acceleration in the vehicle width direction become high, a sideslip angle is produced on wheels and the position and the attitude angle thus have errors, and the errors are likely to be larger if the steering is being turned.

Alternatively, as shown in FIG. 11B, the existent distribution range may be changed continuously with the steering operation angle.

Note that, in this embodiment, θth, Rlgs_min, Rlts_min, and Ryws_min are set, for example, at 3 [rad], 0.2 [m], 0.2 [m], and 0.02 [rad], respectively. Also, Rlgs_max, Rlts_max, and Ryws_max are set at 1.0 [m], 0.5 [m], and 0.05 [rad], respectively. Here, θth is such a steering operation angle that the turning of the vehicle produces motions in the yaw angle direction and vehicle width direction of the vehicle and the errors thus become larger. Also, Rlgs_min, Rlts_min, and Ryws_min represent particle existent distribution ranges at such small steering operation angles that no motions are produced on the vehicle in the vehicle width direction and the yaw angle direction, and are set at appropriate values calculated in advance via tests and simulations. Rlgs_max, Rlts_max, and Ryws_max represent particle existent distribution ranges at such large steering operation angles that motions are produced on the vehicle in the vehicle width direction and the yaw angle direction, and are set at appropriate values calculated in advance via tests and simulations.

Further, the particle existent distribution range can also be set using both the method of this embodiment and the methods of the first and second embodiments. In that case, in each direction, the larger upper and lower limit values may be used to set the existent distribution range.

Advantageous Effects of Third Embodiment

As explained above in detail, the vehicle position attitude-angle estimation device according to this embodiment is such that the existent distribution range is widened in the vehicle width direction and yaw angle direction of the vehicle when the steering angle of the vehicle becomes large. In this way, even when the steering angle becomes large, thus producing movements in the vehicle width direction and the yaw angle direction, the particle existent distribution range can be set appropriately and the position and attitude angle of the vehicle can therefore be estimated accurately.

Note that the above embodiments are mere examples of the present invention and the present invention is therefore not limited to the above embodiments. In other modes than these embodiments, too, various changes can of course be made in accordance with the design and the like without departing from the technical idea of the present invention.

The invention claimed is:

1. A vehicle position attitude-angle estimation device which sets an existent distribution range to a predetermined range by using a particle filter and disperses particles, which represent predicted positions and candidate attitude angles of a vehicle, within the existent distribution range to estimate a position and attitude angle of a vehicle from an image capturing surroundings of the vehicle by a camera mounted on the vehicle which has front wheels and rear wheels, advances in a front-rear direction and corners in a vehicle width direction, comprising:

a vehicle-speed detection unit configured to detect a speed of the vehicle; and a particle-existent-distribution-range setting unit configured to widen the existent distribution range in a vehicle width direction of the vehicle when the speed of the vehicle detected by the vehicle-speed detection unit exceeds a speed threshold, wherein the speed of the vehicle exceeding the speed threshold gives a sideslip angle to wheels of the vehicle producing a motion on the vehicle in the vehicle width direction, and the particle-existent-distribution-range setting unit widens the existent distribution range in the vehicle width direction is in response to the sideslip angle.

2. The vehicle position attitude-angle estimation device according to claim 1, wherein the vehicle-speed detection unit detects the speed of the vehicle as the vehicle is cornering.

3. A vehicle position attitude-angle estimation device which sets an existent distribution range to a predetermined range by using a particle filter and disperses particles, which represent predicted positions and candidate attitude angles of a vehicle, within the existent distribution range to estimate a position and attitude angle of a vehicle from an image capturing surroundings of the vehicle by a camera mounted on the vehicle which has front wheels and rear wheels, advances in a front-rear direction and corners in a vehicle width direction, comprising:

a vehicle-speed detection unit configured to detect a speed of the vehicle; and a particle-existent-distribution-range setting unit configured to widen the existent distribution range in a vehicle width direction of the vehicle when the speed of the vehicle detected by the vehicle-speed detection unit exceeds a speed threshold, wherein the speed of the vehicle exceeding the speed threshold produces a motion on the vehicle in a yaw angle direction, and the particle-existent-distribution-range setting unit widens the existent distribution range in the yaw angle direction in response to the motion.

4. The vehicle position attitude-angle estimation device according to claim 3, further comprising a yaw-rate detection unit configured to detect a yaw rate which is a rate of change of the vehicle in the yaw angle direction, wherein the particle-existent- distribution-range setting unit widens the existent distribution range in the yaw angle direction when the yaw rate detected by the yaw-rate detection unit exceeds the speed threshold.

5. The vehicle position attitude-angle estimation device according to claim 4, wherein when the yaw rate of the vehicle exceeds the speed threshold, the particle-existent-distribution-range setting unit widens the existent distribution range in the vehicle width direction of the vehicle after an elapse of a predetermined period of time following the widening of the existent distribution range in the yaw angle direction of the vehicle.

6. A vehicle position attitude-angle estimation device which sets an existent distribution range to a predetermined range by using a particle filter and disperses particles, which represent predicted positions and candidate attitude angles of a vehicle, within the existent distribution range to estimate a position and attitude angle of a vehicle from an image capturing surroundings of the vehicle by a camera mounted on the vehicle which has front wheels and rear wheels, advances in a front-rear direction and corners in a vehicle width direction, comprising:

a vehicle-speed detection unit configured to detect a speed of the vehicle;

a particle-existent-distribution-range setting unit configured to widen the existent distribution range in a vehicle width direction of the vehicle when the speed of the vehicle detected by the vehicle-speed detection unit exceeds a speed threshold; and a steering-angle detection unit configured to detect a steering angle of the vehicle, wherein when the steering angle detected by the steering-angle detection unit becomes large, the particle-existent-distribution-range setting unit widens the existent distribution range in the vehicle width direction and a yaw angle direction of the vehicle in response to the steering angle becoming large.

7. A vehicle position attitude-angle estimation method for a vehicle position attitude-angle estimation device which sets an existent distribution range to a predetermined range by using a particle filter and disperses particles, which represent predicted positions and candidate attitude angles of a vehicle, within the existent distribution range to estimate a position and attitude angle of the vehicle from an image capturing surroundings of the vehicle by a camera mounted on the vehicle which has front wheels and rear wheels, advances in a front-rear direction and corners in a vehicle width direction, the method comprising:

detecting, by the vehicle position attitude-angle estimation device, a speed of the vehicle; and widening, by the vehicle position attitude-angle estimation device, the existent distribution range in a vehicle width direction of the vehicle when the speed of the vehicle exceeds a threshold speed, wherein the speed of the vehicle exceeding the speed threshold gives a sideslip angle to wheels of the vehicle producing a motion on the vehicle in the vehicle width direction, and widening the existent distribution range in the vehicle width direction is in response to the sideslip angle.

8. The vehicle position attitude-angle estimation method according to claim 7, wherein the detecting the speed of the vehicle is done as the vehicle is cornering.

\* \* \* \* \*